(No Model.) 2 Sheets—Sheet 1.
O. LINLEY.
COPYING CAMERA STAND.
No. 584,182. Patented June 8, 1897.
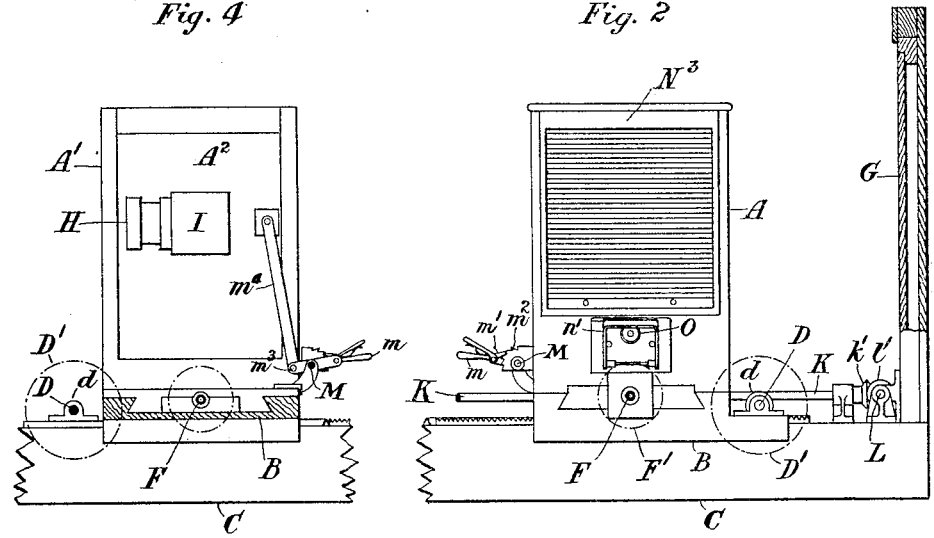
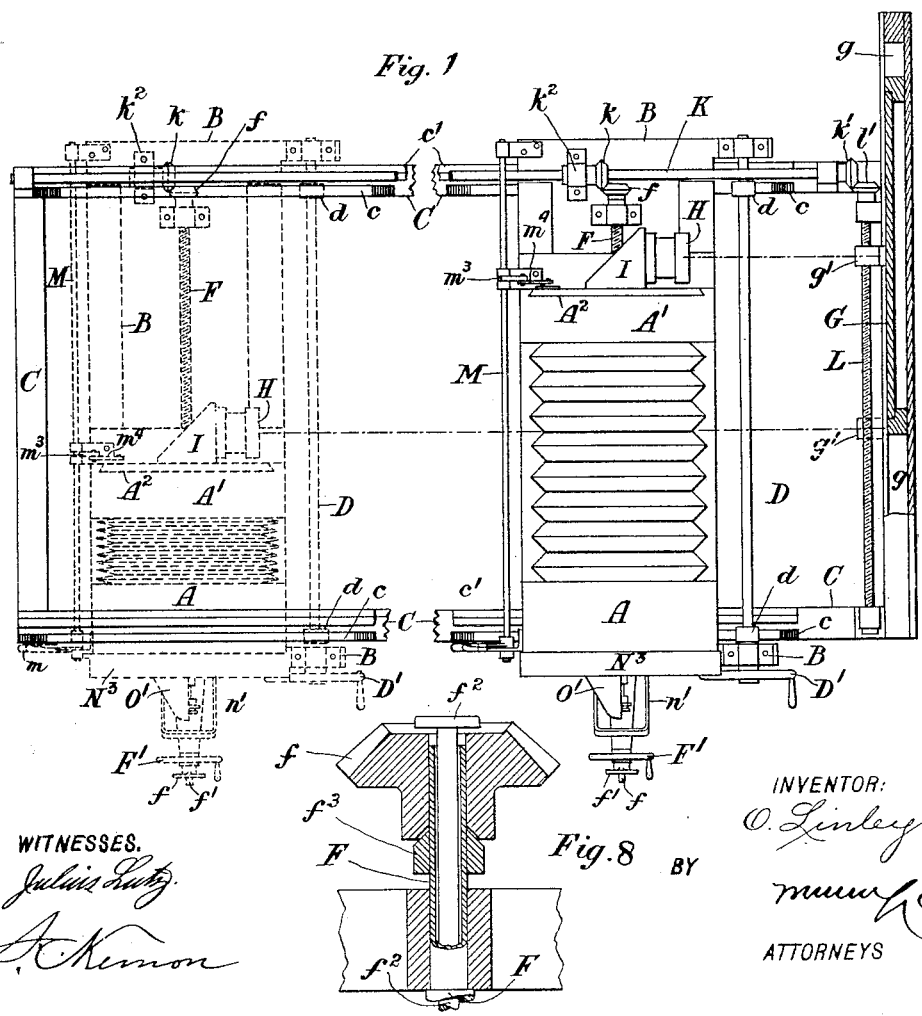
WITNESSES.
Julius Lutz
A. Kernon
INVENTOR:
O. Linley
BY
[signature]
ATTORNEYS (No Model.) 2 Sheets—Sheet 2.
O. LINLEY.
COPYING CAMERA STAND.
No. 584,182. Patented June 8, 1897.
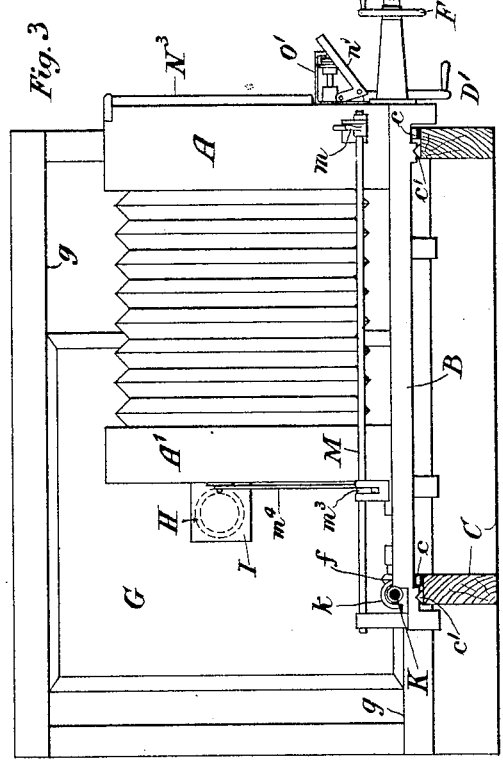
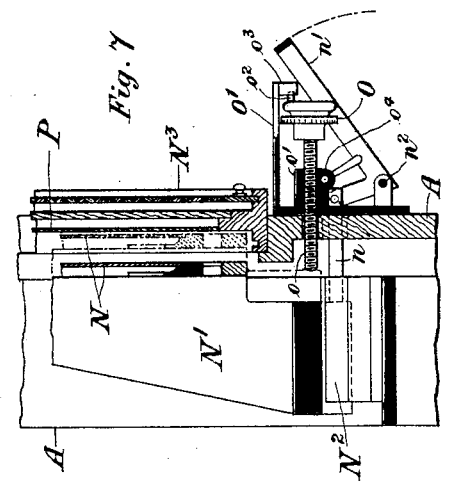
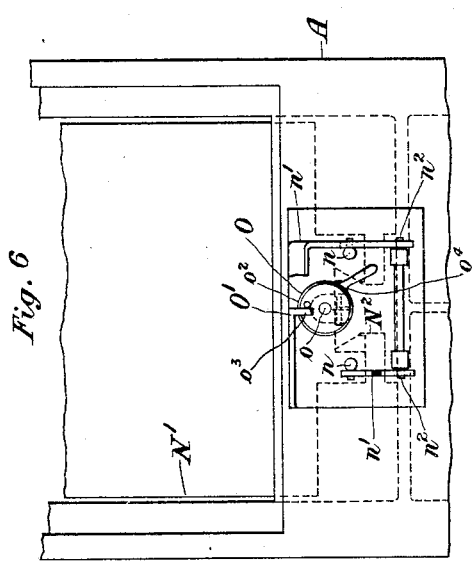
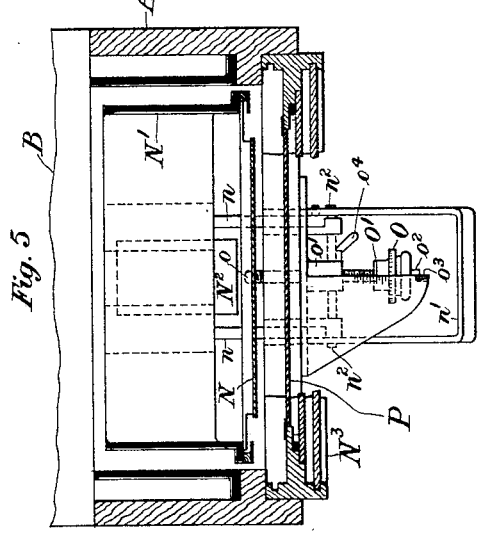
WITNESSES.
Julius Latz.
A. Kennon
INVENTOR:
O. Linley
BY
[signature]
ATTORNEYS.

UNITED STATES PATENT OFFICE.

OWEN LINLEY, OF LONDON, ENGLAND, ASSIGNOR TO FREDERICK OSWALD SCOTT, OF SAME PLACE.

COPYING-CAMERA STAND.

SPECIFICATION forming part of Letters Patent No. 584,182, dated June 8, 1897.

Application filed December 9, 1896. Serial No. 615,069. (No model.)

*To all whom it may concern:*

Be it known that I, OWEN LINLEY, foreman, of 42 St. Luke's Road, Clapham, London, England, have invented new and useful Improvements in the Adjustment of Cameras, of which the following is a full, clear, and exact description.

This invention relates to photographic cameras used for copying and for the production of negatives to be used for making what are known as "process-blocks" for printing purposes. The camera is of that kind in which the camera-front carrying the lens is movable (for the purpose of focusing the picture) in a plane parallel to the plane of the copying-board carrying the subject to be copied. The image projected by the lens is rectified as regards right and left by being reflected by a mirror or prism in a direction at right angles to the optical axis of the lens and in which the whole camera is movable (for the purpose of varying the size of the picture photographed) in a plane perpendicular to the plane of the copying-board; and the invention, so far as the general arrangement of the camera is concerned, has for its object, while permitting independent motion of the camera-front and of the copying-board for the purpose of centering the picture on the focusing-screen, to facilitate the manipulation of the camera by insuring such correlated movements of the copying-board and of the lens in the operation of focusing as to maintain the central position of the picture on the focusing-screen, notwithstanding the motion of the camera as a whole toward or away from the copying-board for varying the size of the picture.

The invention also relates to mechanism for adjusting the ruled screen, which is applied within the camera in front of the plate when the negative is to be used for the production of so-called "process-blocks."

The invention is illustrated in the accompany drawings, forming part of this specification, wherein—

Figure 1 is a plan showing the camera in two positions: in full and dotted lines. Fig. 2 is a rear elevation, Fig. 3 a side elevation, and Fig. 4 a front elevation, of the camera. Fig. 5 is a horizontal section through the back of the camera, showing the process-screen-adjusting device drawn to a larger scale. Fig. 6 is a rear elevation, and Fig. 7 a vertical section of the same. Fig. 8 shows a detail.

The camera is carried by a base-board B, fitted to slide along a cradle C, upon which it is traversed by a shaft D, turned by a hand-wheel D' and having spur-wheels $d$ gearing with racks $c$ along the bars of the cradle. The back part A of the camera-body is fixed rigidly to the base-board, the front A' only being movable for the purpose of focusing by means of the screw-spindle F, turned by the hand-wheel F'. The copying-board G is placed parallel to this direction of motion and is fitted to slide in the direction of its own plane in guide-grooves $g$ at one end of the cradle C, the image of the subject carried by the copying-board being projected by the lens H onto a prism or mirror at I, by which it is reflected onto the focusing-plane of the camera.

In order that the lens and copying-board may move in unison when focusing, so as to maintain the central position of the image on the focusing-screen, the focusing-screw F is geared by a miter-wheel $f$ with another miter-wheel $k$, sliding upon a shaft K, mounted on and extending the whole length of the cradle. This shaft K is geared by miter-wheels $k'$ $l'$ with a screw-shaft L, parallel to and of the same pitch as the focusing-screw and mounted to rotate in bearings in the cradle and upon which is traversed a nut $g'$, attached to the copying-board, so that as the camera-front is moved to and fro in focusing the copying-board is simultaneously moved in the same direction and to the same extent. The miter-wheel $f$ is loose on the focusing-screw F, to which it is normally coupled by a friction-clutch $f^3$, Fig. 8, tightened by a bolt $f'$, passing through the tubular focusing-screw rod F, and by a locking-nut $f^2$. For the purpose of adjusting the relative position of the front of the camera and of the copying-board so as to bring the picture centrally on the focusing-screen the locking-nut $f^2$ is released to allow the screw F to revolve for moving the camera-front to or fro, as required, without transmitting the motion to the copying-board.

The camera is traversed upon ways $c'$ on the cradle toward and away from the copying-board for the purpose of varying the size of the picture. The wheel $k$ (which is connected to the shaft K by a groove-and-feather connection) is journaled in a bearing $k^2$, carried by the base-board B, and slides upon the said shaft, so that motion can be transmitted to the copying-board from any part of the cradle, as will be apparent from Fig. 1, which shows the camera in full and in dotted lines in two positions on the cradle.

Instead of using bevel-gear, as above described, skew-gearing may be used without otherwise altering the arrangement, or rack-gearing may be used, a rack fixed to the camera-front $A'$ gearing with a pinion free to slide on but turning with the shaft K, another pinion, fixed on the end of the said shaft in place of the bevel-pinion $k'$, gearing with a rack fixed to the copying-board in place of the screw L.

The rising front $A^2$ of the camera is adjusted for height by means of a rock-shaft M, mounted in bearings on the base-board B alongside the camera-body and actuated by a lever-handle $m$ at the rear end, provided with a locking-latch $m'$, engaging with a quadrant-rack $m^2$. Upon this rock-shaft and connected to it by a groove and feather rides a jockey-lever $m^3$, carried along the shaft by a bracket attached to the front frame $A'$ of the camera-body, the lever $m^3$ being connected by a link $m^4$ with the rising front $A^2$.

N, Figs. 5 and 7, is the ruled or other process-screen employed for producing half-tone or process negatives. It is held by means of adapters suited to its size in a carrier-frame $N'$, mounted by means of gibs to slide to and fro in the camera upon a dovetailed guide $N^2$, fixed within the back part A of the camera, the sliding motion being imparted through a pair of rods $n$, connected to the gibs passing light-tight through guide-holes in the back of the camera-body below the aperture for receiving the dark slide $N^3$, the ends of these rods being connected by pin and slot with the short arms of a double ∪-shaped bell-crank lever $n'$, pivoted at $n^2$. The rearward motion of the screen-carrier is limited by a micrometer-screw adjustment formed by a screwed stem $o$, screwing through a socket $o'$, mounted on the back part of the body, so that the inner end of the stem $o$ projects into the camera in position to act as a stop for the screen-carrier. The head O of this screw is graduated in fractions of a turn and is read off in connection with a rectilinear gage $O'$, graduated to correspond to the pitch of the screw by means whereof the position of the process-screen can be determined with great accuracy. The zero position of the screw-stop corresponding with the nearest permissible approach of the process-screen to the sensitive plate P is determined by a pin $o^2$ on the head O of the screw engaging with a stop $o^3$ on the gage-carrier. The screw-socket $o'$ is split and provided with a tightening-screw $o^4$, by which it may be clamped on the screw $o$ to prevent any accidental movement of the latter after it has been correctly adjusted. When this adjustment has been determined, the movement of the process-screen carrier effected by means of the bell-crank lever $n'$ enables the dark slide carrying the sensitive plate to be substituted for the focusing-screen and the process-screen to be brought back again into the same relation with the former as it was by trial adjustment set with relation to the latter. It will be obvious that a sliding wedge, a volute cam, a crank, or an eccentric might be substituted for the screw-stop $o$, the eccentric or crank being so arranged that it approaches the dead-center as the process-screen approaches the focal plane, thus giving a slow movement at the point where the utmost accuracy of adjustment is required.

I claim—

1. The combination, with a copying-camera which is bodily movable toward and away from the copying-board and wherein the focusing is effected by a movement of the camera-front in a plane parallel with the copying-board, of gearing connecting the camera-front with the sliding copying-board substantially as described, whereby the copying-board is shifted in its own plane in correlation with the focusing motion so as to maintain constant during the focusing the predetermined position of the picture on the focusing-screen and enable the camera to be adjusted for dimension and focusing of the picture while continuously viewing the picture on the screen, as described.

2. In the herein-described copying-camera, the combination with the focusing and rising front of a rock-shaft extending from the front to back of the base-board, a distance corresponding to the required range of focusing motion, means such as a latch-lever and quadrant for adjusting and locking the rock-shaft, a lever on the rock-shaft, a link connected with the lever and with the rising front, said lever being constrained to turn with the rock-shaft but free to slide thereon so as to participate in the focusing motion of the front, substantially as described.

3. In a camera for the production of negatives for process-blocks, the combination with the process-screen carrier, of a slide-rest adapted for forward and backward motion of the screen with the camera-body, links connecting the slide-rest with a hand-lever at back of the camera, and a micrometer-screw stop adapted to limit the rearward movement of the screen-carrier, substantially as described.

4. In a camera for the production of negatives for process-blocks, the combination with the process-screen carrier, of a rest adapted for forward and backward motion of the screen with the camera-body, links connecting the slide-rest with a hand-lever at back of the camera, and a micrometer-screw stop, a graduated screw-head projecting from the back of the camera alongside a fixed gage graduated to correspond to the pitch of the screw and being provided with a stop adapted to engage with the gage to limit the rearward adjustment of the screw-stop, substantially as described.

5. In a camera for the production of negatives for process-blocks, the combination with the process-screen carrier, of a slide-rest adapted for forward and backward motion of the screen within the camera-body, links connecting the slide-rest with a hand-lever at back of the camera, and a micrometer-screw stop working through a split nut provided with a tightening-screw for clamping the screw-stop after adjustment, substantially as described.

The 13th day of November, 1896.

OWEN LINLEY.

In presence of—
C. G. CLARK,
T. W. KENNARD.